United States Patent
Rouvre et al.

[15] 3,657,626
[45] Apr. 18, 1972

[54] TIMED CONTROL SYSTEMS OF WINDSCREEN WIPERS

[72] Inventors: Philippe Rouvre; Francois Peroy, both of Billancourt, France

[73] Assignees: Regie Nationale des Usines Renault, Billancourt; Automobiles Peugeot, Paris, France

[22] Filed: Sept. 14, 1970

[21] Appl. No.: 71,681

[30] Foreign Application Priority Data

Sept. 17, 1969 France..................................6931586

[52] U.S. Cl......................318/443, 318/DIG. 2, 15/250.02, 15/250.12, 307/141
[51] Int. Cl..............................................B60s 1/02
[58] Field of Search.....................318/443, 444, 445, DIG. 2; 15/250.02, 250.12, 250.17; 307/141, 141.4, 141.8, 142; 317/142

[56] References Cited

UNITED STATES PATENTS

| | | | |
|---|---|---|---|
| 3,335,352 | 8/1967 | Neapolitakis | 318/443 |
| 2,977,623 | 4/1961 | Schmitz | 15/250.17 X |
| 3,262,042 | 7/1966 | Amos | 318/443 |

FOREIGN PATENTS OR APPLICATIONS

| | | | |
|---|---|---|---|
| 1,903,801 | 9/1969 | Germany | 318/443 |

Primary Examiner—J. D. Miller
Assistant Examiner—Robert J. Hickey
Attorney—Stevens, Davis, Miller & Mosher

[57] ABSTRACT

This control system with a timing characteristic for windscreen wiper of automotive vehicles, which comprises a wiper driving motor and an ON-OFF switch, further includes a control circuit connected to the stop contact of said switch, said control circuit comprising a relay with contact means for energizing the wiper motor, a transistor and a push-button switch, disposed in series, the base circuit of said transistor comprising a capacitor the charging time of which determines the conductive time of said transistor and therefore the energization of the wiper motor as a consequence of the actuation of said push-button switch, said relay comprising a contact adapted to hold the transistor and relay assembly in its energized condition when said relay is energized, and also to discharge said capacitor when said relay resumes its inoperative condition.

5 Claims, 2 Drawing Figures

PATENTED APR 18 1972

3,657,626

TIMED CONTROL SYSTEMS OF WINDSCREEN WIPERS

The present invention relates to a device for controlling the operation of the windscreen wipers of automotive vehicles with a time-lag or other timing characteristic, whereby, by simply actuating a push-button electric switch, the driver can cause the wiper brushes to perform only a few to-and-fro movements on the windscreen glass surface. This invention is also concerned with the combination of this control system with that of a windscreen wiper comprising a washer pump, in order to cause in this case the wiper motor to perform a few additional strokes after the windscreen washer pump has ceased to operate.

The chief advantage of this push-button control system is that it permits a wiping the windscreen, in case of moderate rainfall, without actuating the main windscreen switch, in order to simplify the tedious, repeated and conventional switching on and off of the windscreen wiper notably in case of fine drizzle or snow fall. The system of this invention, associated with the conventional windscreen washer system, permits of completing the cleaning of the windscreen when the spraying thereof with cleaning fluid has ceased.

Hitherto known push-button timing control systems systems are objectionable on account of their high cost and complicated structure due mainly to the presence of electronic component elements; the essential advantage of the system according to this invention is that it comprises only one transistor in an extremely simple circuitry providing the desired result as set forth hereinabove.

Basically, the wiper control system with timing characteristic according to this invention for the windscreen wiper of an automotive vehicle which comprises a driving motor and an ON-OFF switch, is characterized in that it comprises a timing control circuit connected to the stop contact of said switch, said timing control circuit comprising in turn a relay having its contacts adapted to control the supply of energizing current to the windscreen wiper motor, a transistor and a push-button or pulse-type control switch connected inseries with said relay and transistor, the base circuit of said transistor comprising a capacitor the charging time of which is adapted to determine the conductive time period of said transistor and therefore the energization of the wiper motor in response to the actuation of said push-button switch, said relay further comprising a contact adapted to hold the transistor and relay assembly in the energized and conductive condition, respectively, when said relay is energized and also to discharge said capacitor when said relay resumes its de-energized condition.

The present invention will be better understood as the following description proceeds with reference to the attached drawing illustrating diagrammatically by way of example two typical forms of embodiment of the control system of this invention. In the drawing.

Figure 1:
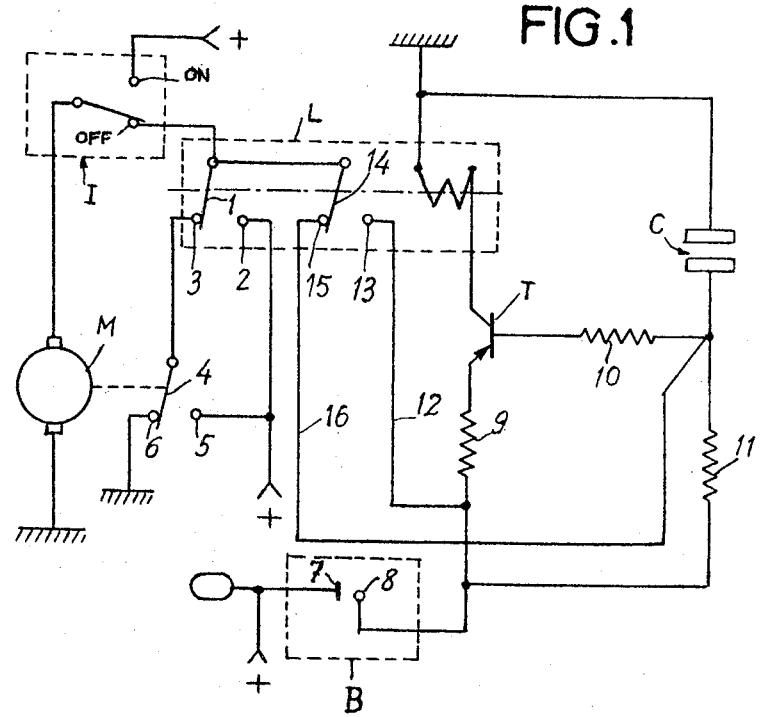
FIG. 1 is a wiring diagram of the first form of embodiment.

Referring first to FIG. 1, the control circuit comprises a windscreen wiper motor M associated with an ON-OFF switch I comprising an ON contact and an OFF contact, as shown.

The OFF contact of switch I is connected to the movable contact arm 1 of an electromagnetic relay L adapted to engage another contact 2 connected to the positive supply terminal for energizing the motor M. In the inoperative condition the contact arm 1 engages another contact 3 connected to a conventional fixed stop contact for de-energizing the relay, this fixed stop contact having a movable arm 4 adapted to engage on the one hand a temporary energizing holding contact 5 and on the other hand a contact 6 for stopping the motor by short-circuiting its armature winding.

The coil winding of relay L is connected in series to a transistor T and a push-button or impulse switch B having its movable contact 7 connected to the positive terminal of the source of current and its other contact 8 connected to the emitter of transistor T via a charging resistor 9. The base of said transistor is connected to a biasing resistor 10 connected in series with a capacitor C connected on the other hand to the negative terminal, the relay coil winding being also connected to this negative terminal, as shown. Another resistor 11 adapted to set the desired time constant of the resistor and capacitor assembly is connected in parallel with said resistors 9 and 10.

An energizing holding conductor 12 is connected in parallel with the positive supply of the emitter of said transistor through contact 8; said conductor 12 is also connected to a contact 13 of relay L, engageable by the movable contact 14 for energizing this relay, said movable contact 14 being electrically and mechanically connected to the other movable contact 1 of relay L. Furthermore, this movable contact 14 coacts with another contact 15 for deenergizing this relay, said contact 15 being connected via a conductor 16 to the plate of capacitor C connected to the base of transistor T.

This control arrangement operates as follows:

In the inoperative condition of the windscreen wiper the contact arm of the main switch I engages the fixed contact OFF, contacts 7, 8 of control switch B being open, relay L deenergized and its movable contacts 1 and 14 in the position shown in FIG. 1, so that motor M is inoperative, with its armature winding short-circuited via contacts 1 and 6, the two capacitor plates having a negative polarity.

To obtain a few strokes only of the windscreen wiper brushes it is only necessary to depress the control push-button of switch B for closing during a short time the contacts 7 and 8 thereof, so that an electric pulse is delivered to the emitter of transistor T which becomes conductive, whereby relay L is energized and its contacts 1 and 14 are caused to engage contacts 2 and 13, respectively.

Thus, the wiper motor M is energized through contact 2, and contact 13 is connected to the positive terminal of the source of current, so that the transistor T and relay L remain energized after the driver has released the push-button of switch B.

However, current will flow through the emitter-base circuit only during the time necessary for charging capacitor C; in other words, when the latter is charged after a time depending on the aforesaid time constant of the circuit, transistor T will become non-conductive and since relay L is no more energized its contacts will resume the positions in which they are shown in the drawing, so that the motor M will be stopped with its armature winding short-circuited as a consequence of the closing of stop contact 6, and capacitor C will be discharged via conductor 16, contact 14 and the aforesaid armature winding.

Thus, the control circuit has resumed completely its initial condition and is ready to be operated in response to another actuation of push-button switch B.

Figure 2:
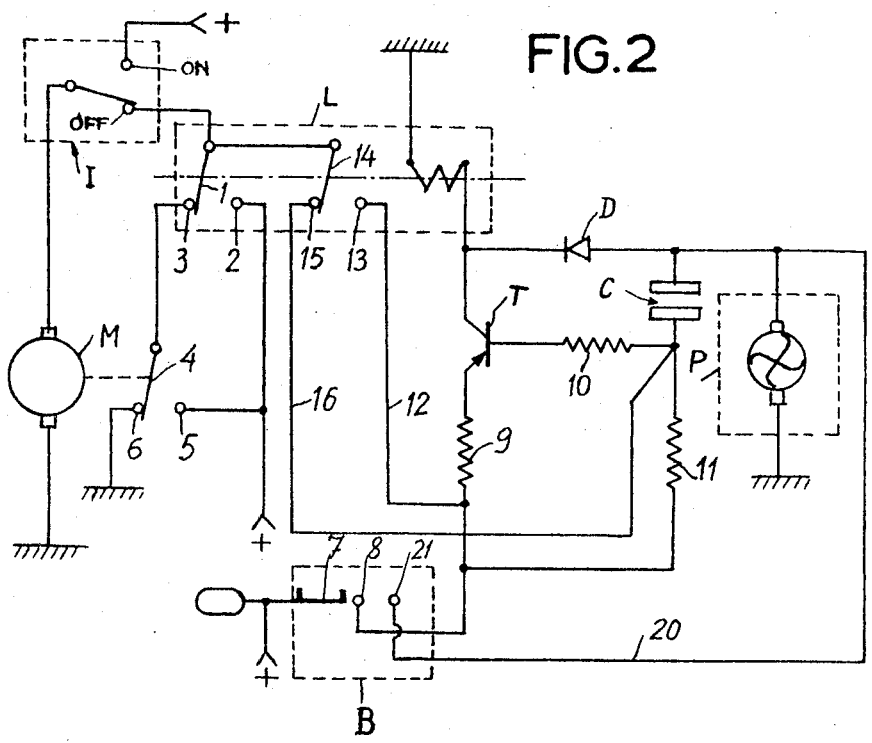
FIG. 2 is a wiring diagram of the second form of embodiment.

FIG. 2 illustrates the combination of the control circuit of FIG. 1, of which the component elements are reproduced and denoted by the same reference numerals, with the control circuit of a windscreen washer comprising a motor and pump unit P.

The rotor of this unit P is connected on the one hand to the negative terminal and on the other hand, via a conductor 20, to an additional contact 21 of the push-button switch B, the latter being so designed in this case that when the push-button is pushed home contacts 7–8 and 21 remain closed, in lieu of only contacts 7 and 8 when the push-button is depressed moderately or only partly as in the preceding form of embodiment.

On the other hand, conductor 20 is connected to the plate of capacitor C which is opposite to that connected to transistor T, and also to a point intermediate transistor T and relay L, a diode D being inserted in the circuit in order to prevent any passage of current from this point to the capacitor and to the motor and pump unit P.

The operation of the windscreen wiper under the control of push-button switch B causing only contacts 7 and 8 to close is exactly the same as in the preceding form of embodiment.

The operation of the assembly comprising the windscreen wiper and washer is obtained by so actuating the push-button switch B that not only contacts 7 and 8 but also contact 21 are closed. Thus, the motor of unit P is energized via conductor 20, relay L being energized through the diode D, so that its movable contact 1 engaging contact 2 will also start the wiper motor M.

Besides the timing circuit comprising transistor T, capacitor C and the above-mentioned resistors is inoperative since the closing of contacts 8 and 21 causes the emitter and collector of transistor T, on the one hand, and the plates of capacitor C, on the other hand to receive the same voltage. However, when the operation of the windscreen washer motor and pump unit P is discontinued under the control of the return movement of push-button switch B to its inoperative position, the pump P is stopped as a consequence of the opening of contact 21 and when this contact is open current is caused to flow through the transistor circuit due to the resumption of a negative polarity of the plate of capacitor C connected to said motor and pump unit P; in other words, the windscreen wiper motor M will be kept in operation during a short period after the windscreen washer has been stopped, this time corresponding to the charging time of capacitor C, which produces a corresponding conductive period of transistor T. This timed operation already described in the foregoing is independent of the time of operation of the windscreen washer and its purpose is to complete the glass cleaning after the spraying of cleaning fluid onto the glass surface.

What is claimed as new is:

1. A control system with timing characteristic for the windscreen wiper of an automotive vehicle which comprises a wiper driving motor and an ON-OFF switch connected to a source of electrical power, comprising a timing control circuit connected to said switch, said timing control circuit comprising in turn a relay having first and second contacts for controlling the supply of energizing current to the windscreen wiper motor, a transistor and a push-button control switch connected in series with said relay and transistor, said control switch being connected to a source of electrical power, said transistor having a base circuit comprising a capacitor, the charging time of which is determinative of the conductive time period of said transistor and means, including at least one of said first and second contacts, for holding the transistor and relay assembly in the energized and conductive condition, respectively, when said relay is energized and also to discharge said capacitor when said relay is in its de-energized condition.

2. The control system as set forth in claim 1 further comprising first and second resistors connected to the base and emitter electrodes of said transistor, respectively, and a third resistor connected in parallel with said first and second contacts, wherein said third resistor determines the time constant of said capacitor.

3. The control system as set forth in claim 1, further comprising a windshield washer pump, means connecting said control switch to said pump, and means extending the operating time of said wiper motor based on the operating time of said washer pump.

4. The control system as set forth in claim 3, wherein said windscreen washer pump comprises a motor and pump unit having control means which include a switch contact following the push-button switch contact, means connecting said switch contact to said motor and pump unit, to the capacitor plate opposite to that connected to the base of said transistor, and also to an intermediate point between said transistor and said relay, and means including a diode, to prevent a flow of current from said intermediate point to said capacitor and said motor and pump unit.

5. A control system for automotive windshield wipers having a time characteristic, comprising a wiper motor; and ON-OFF switch connected to said wiper motor and to a source of electric power; means controlling the supply of current to said motor, including a relay having first and second contacts; means connecting said first contact to said motor; a transistor; a control switch having one terminal connected to a source of power; means connecting said transistor and control switch in series with said relay; a capacitor connected in series with the base electrode of said transistor, said capacitor having a charging time which is determinative of the conductive time of said transistor; means, including said second contact, for maintaining said transistor and relay in an energized and conductive state when said second contact is in a first position; and further means, including said second contact, for discharging said capacitor when said relay is in a de-energized state.

* * * * *